April 3, 1956 R. PERKINS 2,740,524
MEASURING SIFTERS
Filed May 4, 1954 2 Sheets-Sheet 1

INVENTOR.
Roscoe Perkins

April 3, 1956 R. PERKINS 2,740,524
MEASURING SIFTERS
Filed May 4, 1954 2 Sheets-Sheet 2
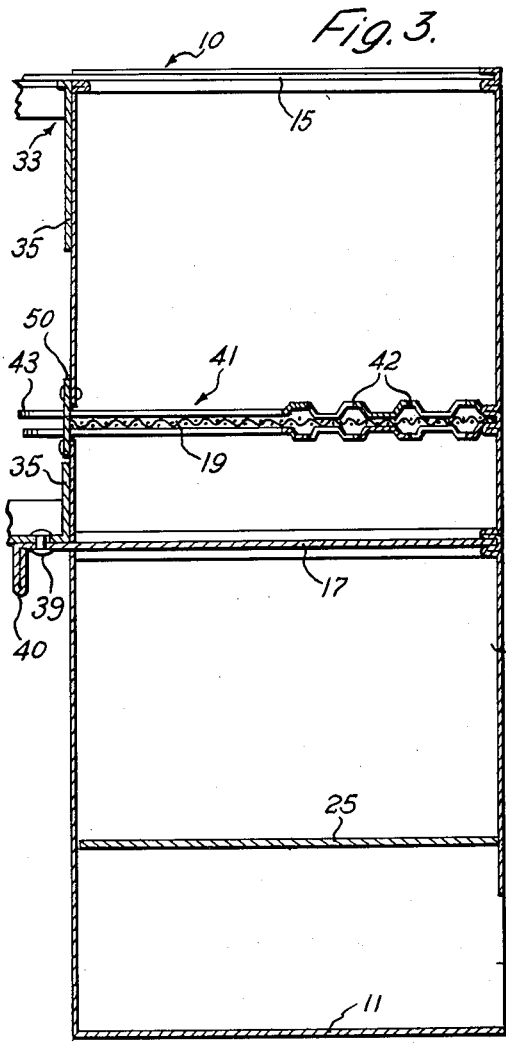
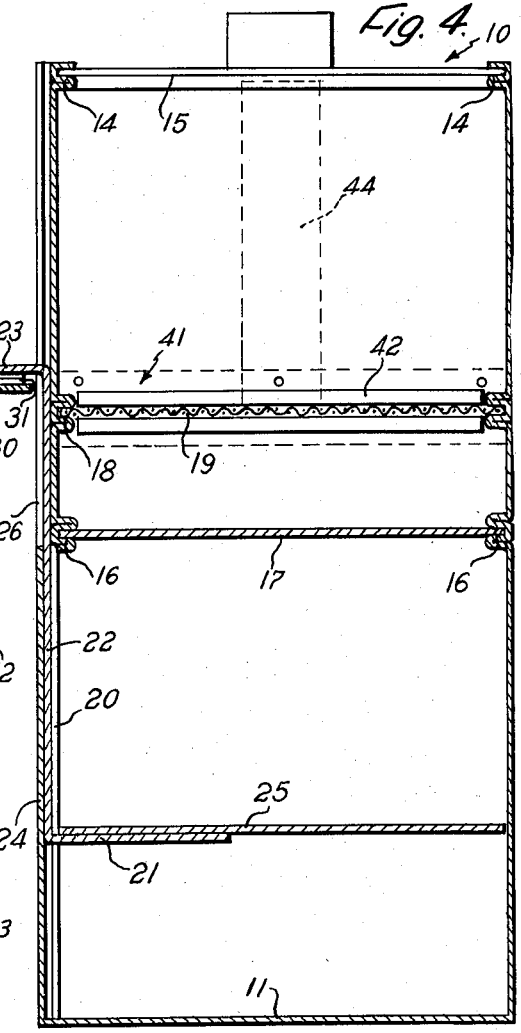
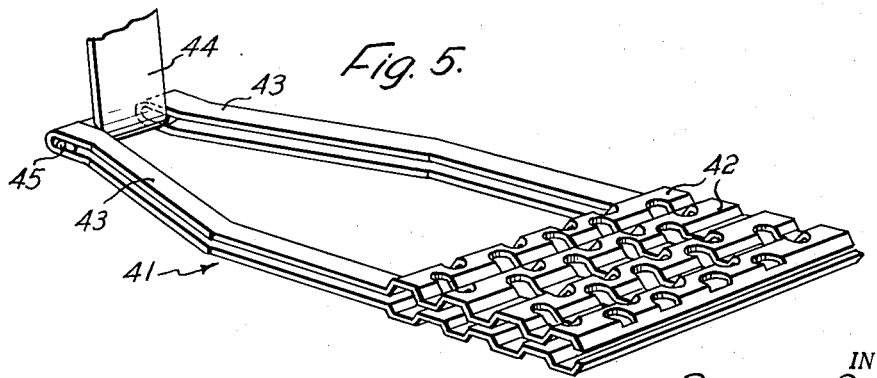
INVENTOR.
Roscoe Perkins

2,740,524

MEASURING SIFTERS

Roscoe Perkins, Fort Smith, Ark.

Application May 4, 1954, Serial No. 427,470

6 Claims. (Cl. 209—357)

This invention relates to sifters for flour or the like.

It is an object of the present invention to provide a sifter for flour or the like which may also be used to accurately measure the quantity of flour sifted.

It is another object of the present invention to provide a measuring sifter of the above type which can be used for resifting quickly and uniformly and which will promote greater baking success by simplifying the operations.

Other objects of the present invention are to provide a sifter bearing the above objects in mind which is of simple construction, inexpensive to manufacture, has a minimum number of parts, easy to use and efficient in operation.

For other objects and a better understanding of the invention, reference may be had to the following detailed description taken in connection with the accompanying drawing, in which:

Fig. 3 is a vertical sectional view taken along the line 3—3 of Fig. 2;

Fig. 4 is vertical sectional view taken along the line 4—4 of Fig. 1; and

Fig. 5 is a perspective view of one of the agitators.

Figure 1:
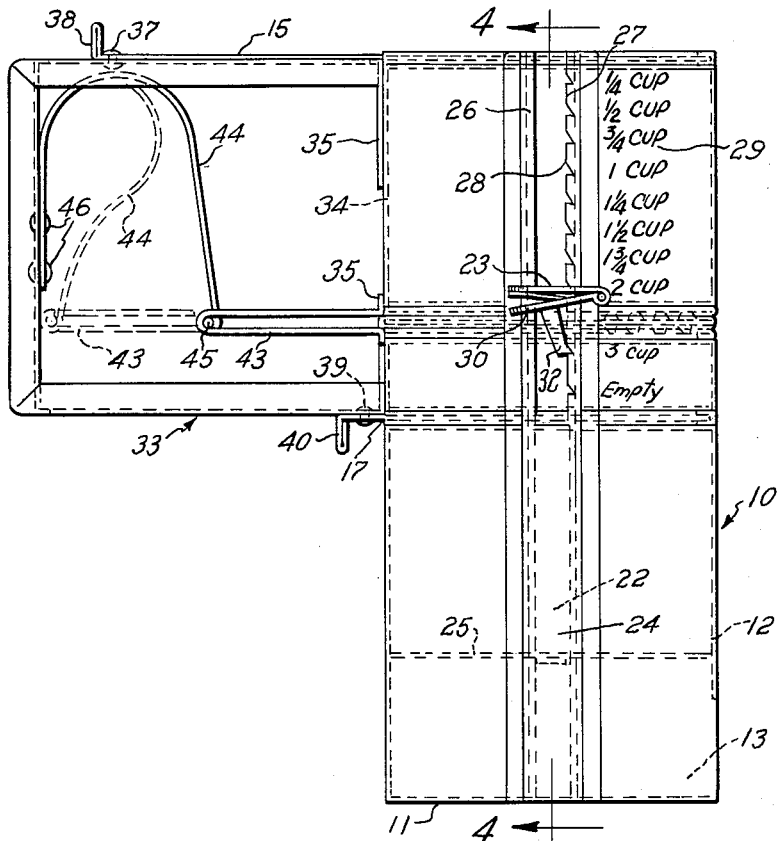
Figure 1 is a side elevational view of the invention.

Referring now more in detail to the drawing, 10 indicates generally an upstanding rectangular container of transparent plastic or other suitable material having a bottom wall 11, the rear wall 12 of the cantainer being provided with an opening 13 (Fig. 1). The upper end of the container 10 is open and is formed along the inside of its opposite longitudinal edges with laterally aligned tracks 14 (Fig. 4) which slidably mount a top shutter 15 which may be extended outwardly, as shown in Fig. 1.

Intermediate the tracks 14 and the bottom wall 11 the container 10 is provided with a second pair of longitudinally extending tracks 16 which slidably receive an intermediate shutter 17 adapted to be extended towards the front of the container in a manner similar to the top shutter 15. As shown in Fig. 3, the container 10 is provided with tracks along its rear inner face which cooperate with the tracks 14 and 16 to receive the rear edges of the shutters 15 and 17. The container 10 is also provided along the inside of its opposite longitudinal sides with tracks 18 which slidably receive a screen 19 for front and rear sliding movement.

Figure 2:
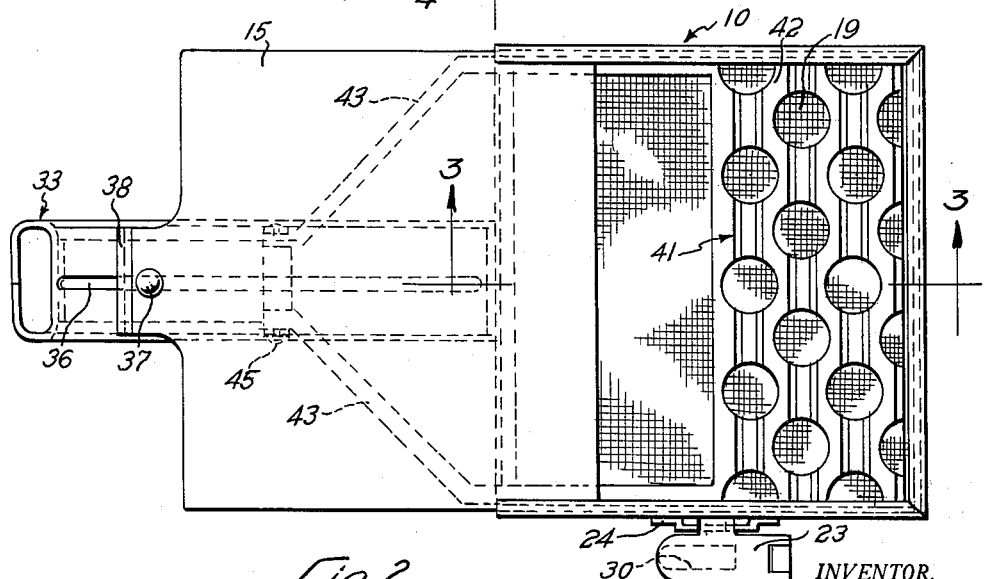
Fig. 2 is a top plan view thereof.

The container 10 along one side is provided with a vertical slot 20 extending from the wall 11 to track 16 (Fig. 4) through which passes the horizontal portion 21 of a connecting bar 22 adapted to slide up and down the outside of the container, the upper end of the connecting bar 22 being formed with a laterally extending portion 23. A guide plate 24 (Fig. 2) is secured to the outside of the container 10 and slidably houses the bar 22, the guide plate 24 extending from the bottom wall 11 to the top of the container.

A plate 25 is secured to the upper face of the horizontal portion 21 of the bar 22 and slides snugly within the container 10 intermediate the track 16 and bottom wall 11 in a piston fit.

The guide bar 24 intermediate the tracks 16 and tracks 14 is provided with an opening 26 and a vertical bar 27 is secured to the container 10 at one side of opening 26 (Fig. 1), the bar 27 being provided with the vertically spaced grooves 28. A scale 29 is marked on the outer face of the container 10 alongside the grooves 28, increasing downwardly from the uppermost groove to a point intermediate the tracks 16 and 18, the scale 29 being calibrated in cups. The lowermost of the grooves 28 just above the tracks 16 (Fig. 1) is marked "Empty." A plate 30 is hingeably mounted on the bottom of the laterally extending portion 23 and is urged downwardly by spring 31, the plate 30 fixedly carrying a finger 32 adapted to engage the grooves 28.

A handle 33 (Fig. 1) of U-shaped cross section is secured to the front wall 34 of the container 10 by means of the flanges 35, the top and bottom surfaces of the handle 33 being in sliding contact with the bottom and upper surfaces of the shutters 15 and 17, respectively. The top horizontal portion of handle 33 is provided with an elongated slot 36 within which rides a double headed rivet 37 mounted in the top shutter 15 whereby to guide the latter, as will be obvious. The vertical handle 38 extends upwardly from the shutter 15 adjacent the rivet 37 to facilitate sliding movement thereof. The bottom portion of handle 33 is similarly provided with a second slot within which rides a double headed rivet 39 mounted in the intermediate shutter 17; the shutter 17 is provided with a downwardly extending handle 40. The screen 19 fits between an agitator 41 (Fig. 5) made up of the upper and lower transverse perforated members 42 and converging arms 43, the forward ends of the latter pivotally mounting a spring handle 44 by means of a pin 45, the other end of spring handle 45 being bent downwardly and secured to the vertical portion of handle 33 by means of rivets 46 (Fig. 1). It will be readily apparent that any type of agitator may be substituted for the agitator 41 without departing from the spirit and scope of the invention. The spring handle 44 serves to retain the agitator 41 in the position of Fig. 3.

The rear edge of the intermediate shutter 17 is bevelled upwardly for a purpose which will hereinafter become clear.

In operation for single or one-time sifting, the container 10 intermediate the agitator 41 and the open top thereof is filled with flour or the like in excess of the amount to be measured. The indicator finger 32 is then moved to the appropriate slot 28 indicated by the scale 29, which will move the sliding plate 25 up or down in the container and gauging the amount that can be sifted into the measuring compartment formed intermediate the moving plate 25 and tracks 16. With the shutter 17 in the open, or outwardly extended, position, the flour is sifted by pulling the spring handle 44 back as many times as is needed for the sifted flour to rise above the level of the tracks 16. The intermediate shutter 17 is then closed by means of handle 40, the upwardly bevelled forward edge thereof shearing the excess flour upwardly to close off the measured contents intermediate the shutter 17 and plate 25 without undue packing. Thus, the forward edge of the intermediate shutter 17 functions in a manner similar to the spatula or knife when leveling off the contents of a measuring cup. Thus, every measurement is uniformly taken and effected without excessive handling.

The piston plate 25 is provided with a layer of flexible plastic to insure a snug fit. The indicator 32 is then removed from its slot 28 and moved downwardly until it engages the slot marked "Empty," thus lowering the plate 25 below opening 13 and permitting the contents to flow out of the side of the container. For resifting the same procedure is used as described above to provide a measured amount. With the intermediate shutter 17 in the closed position of Fig. 3 and top shutter 15 in the open position, the container is inverted, and the excess flour is sifted out. Any ingredient, for example, baking powder, may then be added whereupon the top shutter 15 will be closed and the intermediate shutter 17 opened with the container in the inverted position to resift the flour from one side of screen 19 to the other, as many times as desired. The sifted material may be emptied through either the opening 13 or the open top thereof.

It should now be apparent that there has been provided a measuring sifter which accurately measures the quantity of flour or the like sifted, and which may be used to resift the material quickly and uniformly, the device promoting greater baking success by simplification of the operation. It should also be apparent that there has been provided a device which lessens the dangers of packing and which eliminates the need of spooning from one container to another and spatulating, or shifting from one container to another.

A soft rubber plug 50 (Fig. 3) is provided at the front of the container 10.

While various changes may be made in the detail construction, it shall be understood that such changes shall be within the spirit and scope of the present invention, as defined by the appended claims.

Having thus set forth and disclosed the nature of my invention, what is claimed is:

1. A measuring sifter comprising an upstanding container having an open top, a top shutter slidably mounted within the open top of said container, an intermediate shutter slidably mounted within said container for sliding movement parallel to said top shutter, a screen intermediate and parallel to said top and intermediate shutters, an agitator slidably mounted within said container on each side of said screen, a piston plate slidable within said container intermediate said intermediate shutter and the bottom of said container, and indicator means carried by said piston plate for indicating the volume of flour or the like to be measured intermediate said piston plate and intermediate shutter, said container at the bottom thereof at one side having an opening to permit removal of sifted flour or the like when said piston plate is in its lowermost position.

2. A measuring sifter according to claim 1, said indicating means comprising the side of said container having a vertical opening intermediate the bottom thereof and said intermediate shutter, a bar adapted for sliding movement vertically on the outer face of said container and having a horizontal portion extending through said vertical slot, said piston plate being secured to said horizontal portion, a second horizontal portion at the upper end of said sliding bar external of said container, a spring mounted finger on the undersurface of said second horizontal portion, vertically spaced slots on the side of said container adapted to be selectively engaged by said finger and a guide plate surrounding said vertical bar and vertically spaced slots, said vertically spaced slots being calibrated.

3. A measuring sifter according to claim 2, the lowermost of said vertically spaced slots having indicia to indicate when said piston plate is in its lowermost position.

4. A measuring sifter according to claim 1, including a channel-shaped handle secured to the front of said container at the top thereof intermediate said top and intermediate shutters and having top and bottom horizontal portions in sliding engagement with said top and intermediate shutters and provided with elongated slots, and pins fixedly carried by said intermediate and top shutters adapted to ride in said slots.

5. A measuring sifter according to claim 5, the outer end of said agitator having a flat, substantially U-shaped spring handle pivotally connected thereto at one end, the other end of said handle being secured to the vertical portion of said handle whereby to retain said agitator normally within said container in a forwardmost position.

6. A measuring sifter according to claim 1, said agitator comprising transverse upper and lower perforated bars connected to upper and lower longitudinal bars converging outwardly, said upper and lower longitudinal portions and said transverse portions receiving a screen therebetween.

References Cited in the file of this patent

UNITED STATES PATENTS

| | | |
|---|---|---|
| 160,609 | Mefford | Mar. 9, 1875 |
| 1,354,415 | Nepstad | Sept. 28, 1920 |